United States Patent [19]

Baron et al.

[11] Patent Number: 4,781,461
[45] Date of Patent: Nov. 1, 1988

[54] RPM MEASURING DEVICE UTILIZING AN OPTICAL FIBER COIL AND WINDING METHOD FOR MAKING THE COIL

[75] Inventors: Klaus U. Baron, Heidelberg; Eberhard Kiesel, Edingen, both of Fed. Rep. of Germany

[73] Assignee: Teldix GmbH, Heidelberg, Fed. Rep. of Germany

[21] Appl. No.: 906,081

[22] Filed: Sep. 11, 1986

[30] Foreign Application Priority Data

Sep. 21, 1985 [DE] Fed. Rep. of Germany ....... 3533687

[51] Int. Cl.[4] .................. G01B 9/02; G01C 19/64
[52] U.S. Cl. ................................................ 356/350
[58] Field of Search ......................................... 356/350

[56] References Cited

FOREIGN PATENT DOCUMENTS 0242315 12/1985 Japan ................................. 356/350
2146428 4/1985 United Kingdom ................ 356/350

Primary Examiner—Davis L. Willis
Assistant Examiner—S. A. Turner

Attorney, Agent, or Firm—Spencer & Frank

[57] ABSTRACT

A rpm-measuring device including a closed light path comprising a coil formed of a plurality of winding layers of an optical fiber having first and second ends; a beam splitter connected to the first and second ends; an arrangement for passing two light beams in opposite directions through the coil by applying the two light beams to the first and second ends, respectively, and an arrangement for superposing the two light beams subsequent to their passage through the coil and for evaluating a phase-shift based on the Sagnac-effect. The distance of the light path between the first end and any selected first location of the optical fiber is identical to the distance of the light path between the second end and a second location of the optical fiber. The selected first location and the second location are situated in immediately adjoining two windings belonging to two separate, immediately adjoining winding layers, whereby the two light beams propagate at all times in immediately adjoining two windings belonging to two separate, immediately adjoining winding layers.

6 Claims, 2 Drawing Sheets

RPM MEASURING DEVICE UTILIZING AN OPTICAL FIBER COIL AND WINDING METHOD FOR MAKING THE COIL

BACKGROUND OF THE INVENTION

This invention relates to a device for measuring rotary speed and is of the type which has an optical fiber coil formed of a plurality of winding layers. The optical fiber constituting the coil has two ends, each of which being connected to a beam splitter. Two light beams, after being introduced at the coil ends and passing in opposite directions through the optical fiber coil, are superimposed and the phase shift caused by the Sagnac-effect is evaluated.

An rpm measuring device of the above-outlined type is known and is disclosed, for example, in U.K. Patent Application No. 2,146,428. The optical fiber coil described therein has two ends which are arranged either in the same winding layer or in adjoining winding layers of the coil. It is further a requirement in this prior art structure that both fiber ends be situated closely to one another to establish a symmetry with respect to the fiber coil ends. It has been found, however, that thermal interferences as well as radiation effects have an influence on partial coil zones (external circumference) as well as on the entire coil. Stated differently, such interferences may cause, in the prior art construction of the coil, non-uniform effects on the light rays because in the prior art coil construction a symmetry is ensured only with respect to the coil ends. Such interferences significantly affect the accuracy of the measuring results.

SUMMARY OF THE INVENTION

It is an object of the invention to provide an improved optical fiber coil of the above-outlined type from which the discussed disadvantages are eliminated.

This object and others to become apparent as the specification progresses, are accomplished by the invention, according to which, briefly stated, the optical fiber coil is so constructed that both light beams propagate within the entire optical fiber coil at all times in immediately adjoining winding layers.

It is an advantage of the invention that all types of interferences based, for example, on temperature or sound conditions, at all times affect both optical fibers (associated with the one and the other light beam) at the same longitudinal distance from the optical coupling system, that is, such effects occur symmetrically to the fiber ends. As a result, the interferences are neutralized and thus can have no effect on the measuring results.

According to a further feature of the invention, for the purpose of a further improvement of the insensitivity to interferences, the optical fiber coil has an even number of winding layers.

DESCRIPTION OF THE PREFERRED EMBODIMENT

Figure 1:
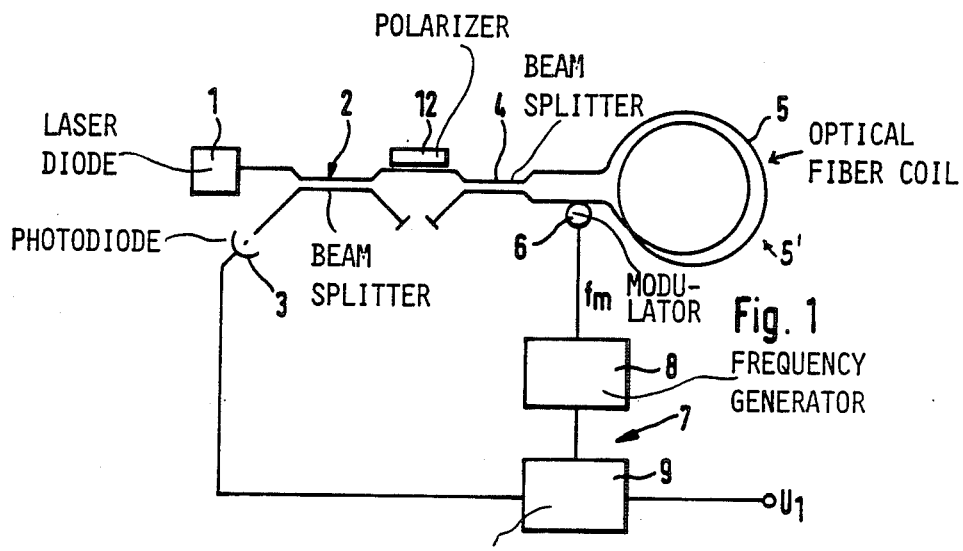
FIG. 1 is a schematic illustration of an rpm measuring device incorporating the invention.

Turning to FIG. 1, the rpm measuring device schematically shown therein comprises a laser diode 1, beam splitters 2 and 4, a photodiode 3, a polarizer 12, an optical fiber coil 5' constructed according to the invention from an optical fiber 5, a modulator 6 and an evaluator 7. The latter is formed of a frequency generator 8 and a phase-sensitive rectifier circuit 9. The frequency generator 8 emits a signal which is applied to the modulator 6 and the rectifier 9.

For a phase-sensitive determination of rpm's, it is necessary to modulate, by means of the modulator 6, the phase position of the light waves propagating in the optical fiber coil 5'. For this purpose, the modulator 6 may comprise, for example, a piezoelectric body about which one or more windings of the optical fiber 5 is wound. The piezoelectric body modulates the length of the optical fiber 5 in response to the control signals emitted by the frequency generator 8. The signal detected by the photodiode 3 and the reference signal of a frequency $f_m$ emitted by the generator 8 are applied to the phase-sensitive rectifier circuit 9.

After a phase-sensitive rectification of the detector signal at the modulating frequency $f_m$, the rpm-proportional output signal $U_1$ is delivered by the rectifier 9.

The above-described general construction and functioning of the rpm-measuring device is known and its operation conventionally utilizes the Sagnac-effect.

Figures 2A, 2B:
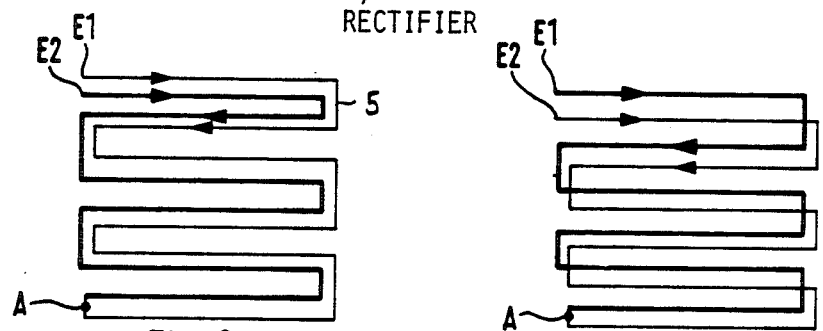
FIG. 2a is a diagrammatic illustration of the winding pattern of an optical fiber coil according to a preferred embodiment of the invention.
FIG. 2b is a diagrammatic illustration of a variant of the preferred embodiment.

Turning now to FIG. 2a there is illustrated therein the particular winding pattern of the optical fiber coil 5' according to the invention. The two ends E1 and E2 of the optical fiber 5 are the locations of transition to the beam splitter 4 and the modulator 6, respectively. The two superposed light beams propagate in the direction of the arrows parallel to one another towards the beginning A of the optical fiber 5. Point A represents the midpoint (halving point) of the fiber length which is uninterrupted. The two light beams intersect at point A and return in the respective adjoining branches of the optical fiber 5. Thus, as it may be clearly observed in FIGS. 2a and 3, the two light beams propagate at all times axially, codirectionally in radially immediately adjacent turns belonging to radially immediately adjoining winding layers. Thus, an interference, caused, for example, by a change in the length of one part of the optical fiber coil effects simultaneously both light beams uniformly and therefore has no distorting effect on the measuring results. A variant of the coil pattern is illustrated in FIG. 2b which will be described in more detail later.

Figure 3:
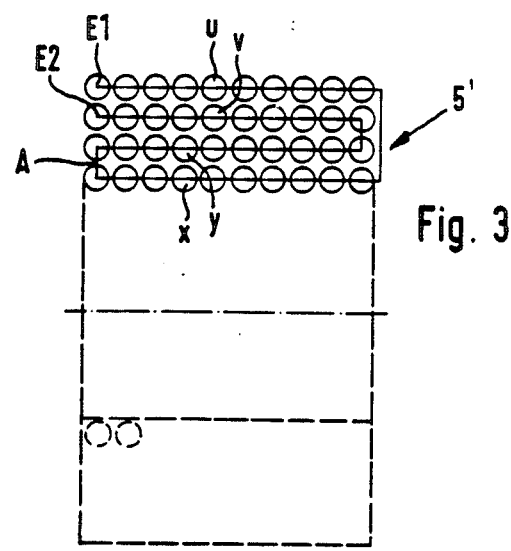
FIG. 3 is a schematic cross-sectional view of the optical fiber coil according to the preferred embodiment.

Referring once again to FIG. 3, there is shown in cross section the optical fiber coil 5' made according to the pattern illustrated in FIG. 2a. The winding pattern of FIG. 2a is shown in solid lines drawn through the filament cross sections. While in FIG. 3 only four winding layers are shown, it is to be understood that the winding pattern may be applicable for a desired number of layers. FIG. 3 clearly illustrates that the optical fiber portions which have the same distance from the center (beginning A of the coil) of the optical fiber 5, are in an immediately adjoining relationship. Thus, for example, the adjoining fiber length portions x and u or v and v are at an equal distance from the center A and are thus exposed to substantially the same environmental effects. This arrangement thus cancels out (neutralizes) interferences to which the two fiber length portions are exposed. The compensation has the best effect in case the optical fiber coil 5' has an even number of winding layers.

It is a significant advantage of the winding pattern according to the invention as discussed in connection with FIGS. 2a and 3 that the optical fiber 5 is continuous from one end E1 to the other end E2 and thus, complex connections of the beginnings of the fiber are not needed and there are experienced no splicing losses and no back-scatter effects.

Figure 4A:
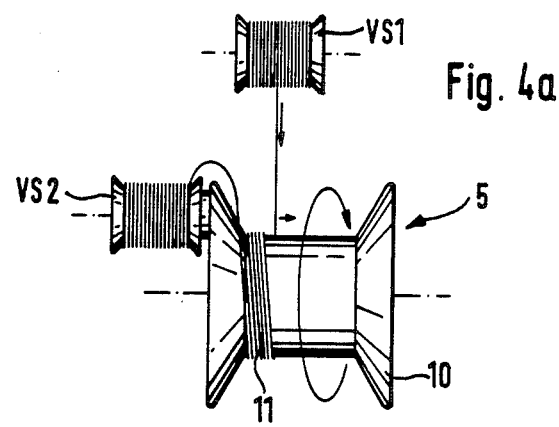
FIGS. 4a and 4b illustrate steps of a winding process to obtain the optical fiber coil illustrated in FIGS. 2a and 3.
Figure 4B:
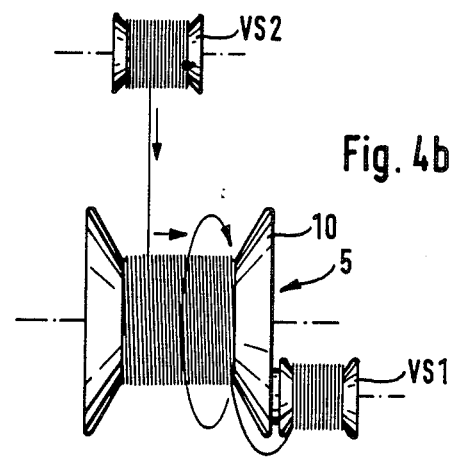

The method of winding the optical fiber coil 5' in a pattern illustrated in FIGS. 2a and 3 is shown in FIGS. 4a and 4b. The significant characteristic of the coiling technique is the division of the optical fiber onto two supply spools VS1 and VS2. Such a division is carried out prior to the winding proper such that each supply spool contains one half of the total, uninterrupted fiber length. As shown in FIG. 4a, at the beginning of the winding operation, the supply spool VS2 is secured eccentrically to the left side of the rotary mandrel 10 and a first winding layer 11 is wound on the mandrel 10 from the supply spool VS1 from left to right. Thereafter the supply spool VS1 is secured eccentrically to the right side of the mandrel 10 as shown in FIG. 4b and a second layer of fiber is wound, again from the left to the right, from the supply spool VS2. Thereafter, a third layer (not illustrated) is wound from the supply spool VS2 from right to left, whereupon the supply spool VS2 is secured to the mandrel 10 and a fourth and fifth layer are wound by taking the optical fiber from the supply spool VS1. These consecutive winding steps continue until the coil ends on the supply spool VS1 and VS2 are reached and thus the coil has a desired number (preferably an even number) of winding layers. During the winding of the individual layers or upon completion of the optical fiber coil an adhesive is applied to the optical fiber to thus obtain a self-supporting coil as the latter is removed from the mandrel 10.

Turning once again to FIG. 2b, the winding pattern shown therein differs from that illustrated in the embodiment described in connection with FIGS. 2a and 2a and 3 solely in that throughout the winding process the two supply spools VS1 and VS2 are used alternatingly rather than utilizing fiber from the same spool in the two consecutive windings.

The present disclosure relates to subject matter contained in German Patent Application No. 35 33 687.0 (filed Sept. 21st, 1985) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an rpm-measuring device including a closed light path comprising a coil formed of a plurality of winding layers of an optical fiber having first and second ends; a beam splitter connected to said first and second ends; means for passing two light beams in opposite directions through said coil by applying the two light beams to said first and second ends, respectively, and means for superposing the two light beams subsequent to their passage through said coil and for evaluating a phase-shift based on the Sagnac-effect; the improvement wherein the distance of the light path between the first end and any selected first location of said optical fiber is identical to the distance of the light path between the second end and a second location of said optical fiber; said selected first location and said second location being situated in immediately adjoining two windings belonging to two separate, immediately adjoining winding layers, whereby the two light beams propagate at all times in immediately adjoining two windings belonging to two separate, immediately adjoining winding layers.

2. An rpm-measuring device as defined in claim 1, wherein the number of said winding layers is even.

3. In an rpm-measuring device including a closed light path comprising a coil formed of a plurality of winding layers of an optical fiber having first and second ends; a beam splitter connected to said first and second ends; means for passing two light beams in opposite directions through said coil by applying the two light beams to said first and second ends, respectively, and means for superposing the two light beams subsequent to their passage through said coil and for evaluating a phase-shift based on the Sagnac-effect; the method of making said coil, comprising the following steps:
 (a) winding one half of the optical fiber length on a first supply spool and the other half of the optical fiber length on a second supply spool while maintaining the optical fiber uninterrupted along its entire length, whereby a mid point of the entire length of said optical fiber being situated between said first and second supply spools;
 (b) starting from said mid point, winding a first layer of said optical fiber on a mandrel from said first supply spool in a first longitudinal direction of said mandrel;
 (c) starting from said mid point, winding a second layer of said optical fiber on said mandrel from said second supply spool in said first longitudinal direction;
 (d) winding a third layer of said optical fiber on said mandrel from said second supply spool in a second longitudinal direction of said mandrel, opposite said first longitudinal direction;
 (e) winding a fourth layer of said optical fiber on said mandrel from said first supply spool in said second longitudinal direction; and
 (f) repeating the winding steps (b) through (e) until a desired number of winding layers is obtained from said optical fiber length.

4. A method as defined in claim 3, further comprising the step of fixing each said winding layer with an adhesive.

5. A method as defined in claim 3, wherein said desired number is an even number.

6. In an rpm-measuring device including a closed light path comprising a coil formed of a plurality of winding layers of an optical fiber having first and second ends; a beam splitter connected to said first and second ends; means for passing two light beams in opposite directions through said coil by applying the two light beams to said first and second ends, respectively, and means for superposing the two light beams subsequent to their passage through said coil and for evaluating a phase-shift based on the Sagnac-effect; the method of making said coil, comprising the following steps:
 (a) winding one half of the optical fiber length on a first supply spool and the other half of the optical fiber length on a second supply spool while maintaining the optical fiber uninterrupted along its entire length, whereby a mid point of the entire length of said optical fiber being situated between said first and second supply spools;

(b) starting from said mid point, winding a first layer of said optical fiber on a mandrel from said first supply spool in a first longitudinal direction of said mandrel;

(c) starting from said mid point, winding a second layer of said optical fiber on said mandrel from said second supply spool in said first longitudinal direction;

(d) winding a third layer of said optical fiber on said mandrel from said first supply spool in a second longitudinal direction of said mandrel, opposite said first longitudinal direction;

(e) winding a fourth layer of said optical fiber on said mandrel from said second supply spool in said second longitudinal direction; and (f) repeating the winding steps (b) through (e) until a desired number of winding layers is obtained from said optical fiber length.

* * * * *

UNITED STATES PATENT AND TRADEMARK OFFICE
CERTIFICATE OF CORRECTION

PATENT NO. : 4,781,461            Page 1 of 2

DATED : November 1, 1988

INVENTOR(S) : Klaus U. Baron et al

It is certified that error appears in the above-identified patent and that said Letters Patent is hereby corrected as shown below:

In the drawing, Fig. 4b should appear as shown on the attached sheet.

UNITED STATES PATENT AND TRADEMARK OFFICE
CERTIFICATE OF CORRECTION

PATENT NO. : 4,781,461

DATED : November 1, 1988

INVENTOR(S) : Klaus U. Baron et al

It is certified that error appears in the above-identified patent and that said Letters Patent is hereby corrected as shown below:

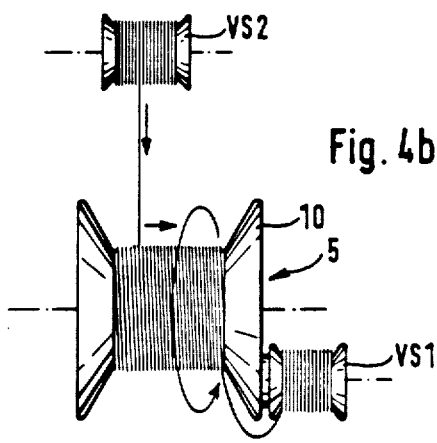

Fig. 4b

Signed and Sealed this

Sixteenth Day of May, 1989

Attest:

DONALD J. QUIGG

Attesting Officer

Commissioner of Patents and Trademarks